May 13, 1952 S. H. LAPIDUS 2,596,858
SIGNAL CONTROL DEVICE
Filed May 12, 1950 2 SHEETS—SHEET 2
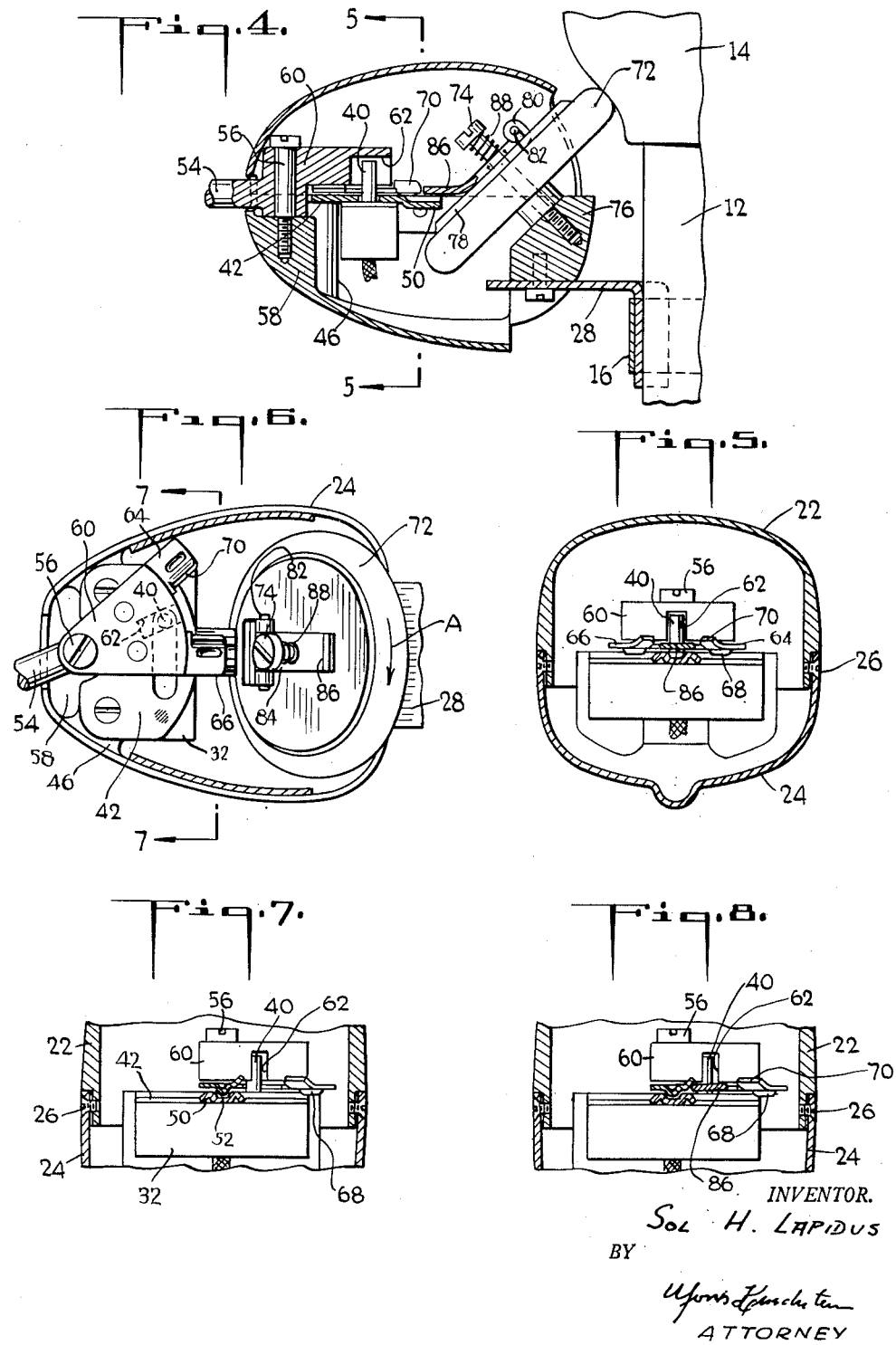
INVENTOR.
Sol H. Lapidus
BY
ATTORNEY Patented May 13, 1952

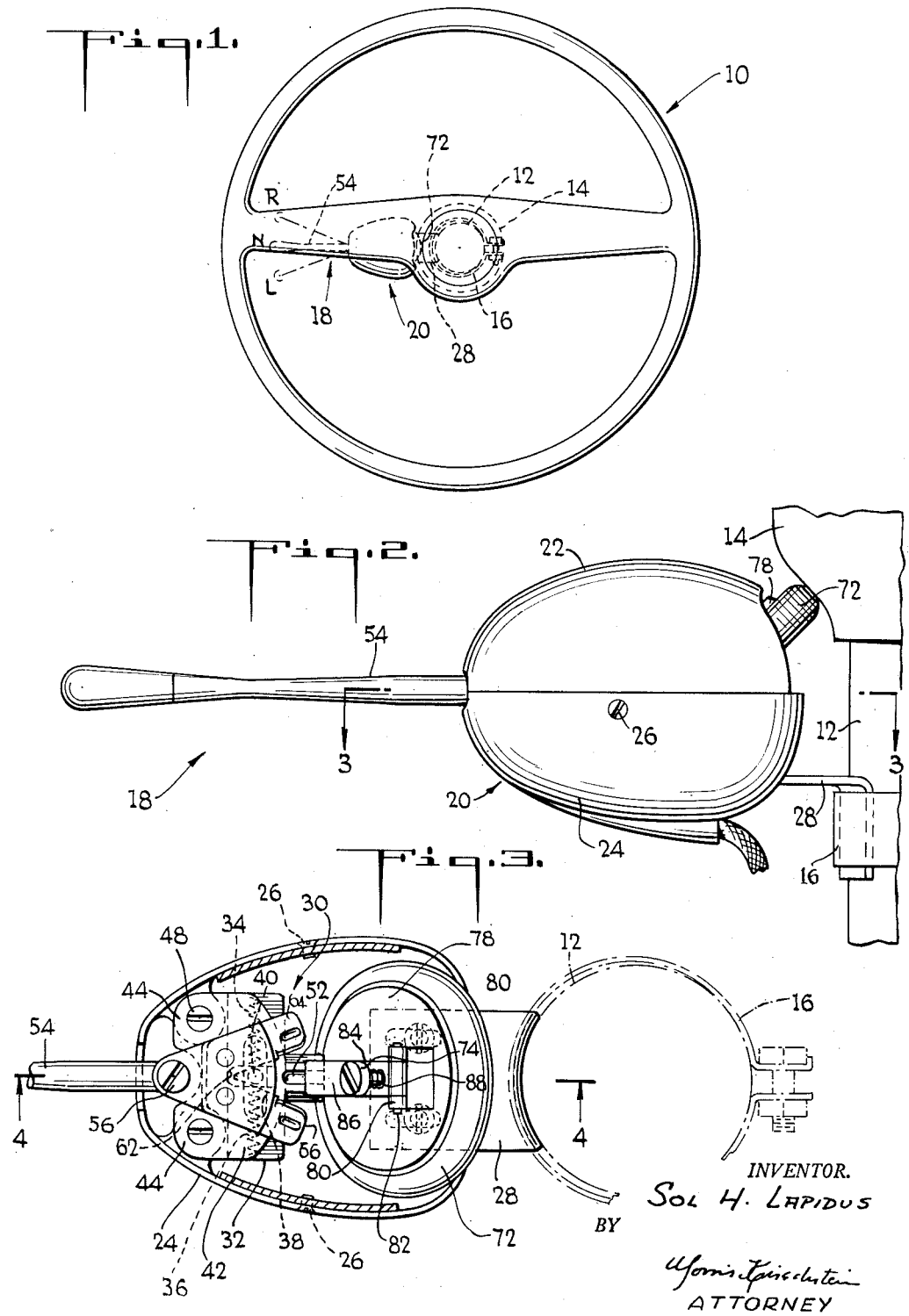

2,596,858

UNITED STATES PATENT OFFICE 2,596,858

SIGNAL CONTROL DEVICE

Sol H. Lapidus, Brooklyn, N. Y., assignor to U. S. Metal Products Company, Inc., Brooklyn, N. Y., a corporation of New York Application May 12, 1950, Serial No. 161,691

7 Claims. (Cl. 200—59)

This invention relates to signal control devices.

More particularly my invention pertains to a device of the character described which is particularly designed to be attached as an accessory to an automobile for the control of signalling lights.

Even more specifically my invention is concerned with a device of the character described which is self-cancelling; that is to say, which after being set manually to indicate a given direction of turn, will be reset automatically upon the completion of such a turn.

Heretofore, a great variety of such devices have been proposed, all of them bulky, cumbersome, and intricate. Very few of these ever have been marketed and the few that have been made were comparatively complex and expensive to manufacture.

It is an object of my invention to provide a control device of the character described which constitutes extremely few and simple parts and can be manufactured at a very low cost.

It is another object of my invention to provide a control device of the character described which is rugged and highly reliable in operation.

Other objects of my invention will in part be obvious and in part will be pointed out hereinafter.

My invention accordingly consists in the features of construction, combinations of elements and arrangements of parts which will be exemplified in the device hereinafter described and of which the scope of application will be indicated in the appended claims.

In the accompanying drawings, in which is shown one of the various possible embodiments of my invention, Fig. 1 is a plan view of the steering wheel of an automobile with a control device embodying my invention secured to the steering column and illustrated in neutral position;

Fig. 2 is an enlarged side view of said device;

Fig. 3 is a sectional view taken substantially along the line 3—3 of Fig. 2;

Fig. 4 is a sectional view taken substantially along the line 4—4 of Fig. 3;

Fig. 5 is a sectional view taken substantially along the line 5—5 of Fig. 4;

Fig. 6 is a view similar to Fig. 3 but with the device operated to indicate a left-hand turn;

Fig. 7 is a fragmentary sectional view taken substantially along the line 7—7 of Fig. 6; and Fig. 8 is a view similar to Fig. 7, but illustrating the parts as they appear just prior to restoration of the device to neutral position.

Referring now in detail to the drawings, the reference numeral 10 denotes a conventional steering wheel at the upper end of a steering column which is enclosed in a stationary steering post 12. The wheel includes a hub 14.

Detachably attached to the steering post in any suitable fashion, as for instance by a clamping ring 16, is a signal control device 18 embodying my invention. Said device includes a housing 20 which for convenience may constitute an upper half 22 and a lower half 24 interfitted and held together as by screws 26. The housing is fastened to the clamping ring in some suitable manner, as by an angle bracket 28.

Enclosed within the housing is a signal control mechanism 30 including a switch 32 of standard double throw construction. Said switch is of the single pole type; although it should be understood that any suitable form of switch can be used depending upon the character of the signalling circuit employed. Customarily, a single line circuit is used for automotive vehicles, the chassis of the automobile constituting a ground. In such a case, there will be one line running to the right-hand signals and one to the left-hand signals. Each of these lines is in series with a battery and the switch 32 which thereby can selectively energize either set of signals.

In addition to its conventional stationary and movable electric contacts, said switch includes a pair of springs 34, 36 which bias the movable contact (not shown) to a central neutral position wherein it is disengaged from both stationary contacts. The movable contact is carried by a reciprocable block 38 from which a fixed pin 40 projects upwardly, so that movement of the pin to one side or the other of its neutral position indicated in Fig. 3 causes the movable contact to engage one or the other of the fixed contacts and thereby closes the left-hand or right-hand signalling circuit. Due to the springs 34, 36 the switch is of the momentary type; that is to say, unless the pin 40 is held in either operative position, said springs will restore the switch to neutral position.

Mounted on top of the switch, as by constituting the top plate of the switch or by being secured, for instance, by welding to the top plate of the switch, is a plate 42 having a pair of ears 44. Said ears are seated on posts 46 formed integrally with the lower casing half 24 and are secured thereto as by screws 48. The top plate also includes a forwardly extending tongue 50, in which there is fashioned an indentation 52, for example, in the form of a recess.

The switch is arranged to be manually operated by a lever 54 pivoted on a shouldered screw 56 which is threaded into a shelf 58 formed on the inner surface of the lower casing half. The short inner end 60 of said lever has a radially extending recess 62 formed in its under side to slidably receive the pin 40. Thus, when the lever is shifted about the pivot 56, it will reciprocate the pin 40.

The switch contacts are so arranged that when the outer end of the lever is swung downward to the lower of the two dot-and-dash line positions indicated in Fig. 1, it will close the switch contacts for and energize the left directional signalling devices. Hence, this position of the lever is indicated by the reference character L in said figure. The upper position of the lever is indicated by the reference character R denoting that in said position the right directional signalling devices are energized. The central position of the lever is indicated by the reference character N denoting "neutral."

Means is included releasably to detain the lever in either one of its operative positions. Said means comprises a pair of leaf springs 64, 66, each having one end fastened in some suitable manner, e. g. by welding, to the under surface of the inner end 60 of the operating lever 54. Said springs are made from flat resilient material, such for instance as Phosphor bronze. The leaf springs are arranged parallel to the top plate 42 of the switch in a plane immediately above the top or mouth of the recess 52. Each spring is provided with a downwardly projecting nib 68 which is disposed at a level below the mouth of the recess. The nibs are spaced apart angularly by an arc equal to the rotary movement of the operating lever between its two operative positions. The nibs are symmetrically disposed on opposite sides of the recess 52 when the lever is in neutral position. Thus, one or the other of the nibs is located in the recess when the lever is moved to one or the other of its operative positions. The leaf springs are sufficiently stiff to detain a nib in the recess against the restoring action of the springs 34, 36. Each spring is asymmetric about a line extending through the nib radially from the pivot 56. More specifically, the side edges of each spring are differently constituted. At least one side edge is sloped, and, if the other edge also is sloped, it is reversely slanted. For example, if one edge of one spring slopes upwardly and outwardly of the spring, the other edge of this spring will slope upwardly and inwardly; although both edges need not be sloped. Moreover, the slopes of the two springs are reversed. In the device shown, I have formed the inner edge of each spring with a slanted wing 70, both wings sloping upwardly and outwardly of their associated springs. The same selective effect, later to be described, will be secured if, for example, the wing on one spring were on the inner edge, sloping upwardly and outwardly, and the wing on the other spring were on the outer edge and sloped upwardly and inwardly; it being understood that the inner edge of one spring corresponds to the outer edge of the other spring.

The device also includes means to release the temporary detaining means when the turn corresponding to an indicated turn has been completed. Said cancelling means constitutes a friction wheel, such for example as a rubber disk 72, mounted for rotation on a post 74 which is secured, as by screwing, on an angular platform 76 formed integrally with the lower half 24 of the casing. The disk is in permanent engagement with the hub 14 of the steering wheel. Said disk turns with a metal plate 78 disposed on its upper surface. The plate is formed with a pair of ears 80 in which a pintle 82 is secured. Said pintle rotatably supports an unlatching dog 84 constituting a metal strip having an upturned tip 86. The dog is slotted to pass the post 74 and a spring 88 encircling said post biases the dog against the plate 78.

The post 74 is so angularly inclined and located with respect to the recess 52 that the tip 86 of the unlatching dog travels in a circular path which at its lowermost level sweeps over the top of said recess. The sides of the tip are rounded, as indicated for example in Fig. 8. With this arrangement, when the bent tip approaches a leaf spring 64, 66 whose nib 68 is in engagement with the recess 52, if the approach is toward the inner side of the spring having the inclined wing 70, said tip will engage the undersurface of the wing and lift the spring upwardly. The lifting action disengages the nib from the recess and permits the restoring force of the springs 34, 36 to snap the switch and operating lever back to neutral position.

On the other hand, if a leaf spring in operative position is approached from its outer side by the tip of the unlatching dog, said dog which then is descending will strike the upper surface of the leaf spring and will ride over said spring thus leaving it undisturbed. The dog will raise during such movement because of pivotal movement about the pintle 82. It should be observed that if the inner edges are unmodified, i. e. in the planes of the springs, and the outer edges are sloped downwardly and outwardly, the sweep of the tip should be so arranged that it will strike the under surface of one spring when the tip rotates in one direction about the post 74 and the upper surface of the same spring when the direction of rotation is reversed. Since the springs are oppositely sloped, the action of the tip on the other spring is just the contrary.

To better understand the operation of the device, let it be supposed that the lever 54 has been moved to a left-hand signalling position shown, for example, in Fig. 6. If thereafter the steering wheel is turned in a counter-clockwise direction to make the indicated left turn, the rubber disk will move in the direction indicated by the arrow A, thereby causing the unlatching dog to sweep over the top surface of the "left-hand" leaf spring 66. This will not disengage said spring from the recess 52. Subsequently, to complete the operation, the steering wheel will be swung in a clockwise direction which will reverse the direction of movement of the rubber disk and cause the unlatching dog to move its bent tip beneath the left-hand leaf spring, so as to raise the same and permit the switch to be restored to neutral position.

It thus will be seen that I have provided a device which achieves all the objects of my invention and is well adapted to meet the conditions of practical use.

As various possible embodiments might be made in the above invention, and as various changes might be made in the embodiment above set forth, it is to be understood that all matter herein described, or shown in the accompanying drawings, is to be interpreted as illustrative and not in a limiting sense.

Having thus described my invention, I claim as new and desire to secure by Letters Patent:

1. A self-cancelling mechanism adapted to be used in connection with a signal control device that includes a switch having an operating element which is movable between a neutral position and an operative position and which element is biased to neutral position from operative position, said device further including a pivoted operating lever for actuating the operating element: said self-cancelling mechanism comprising a first member which is stationary, a movable second member, means to mount said second member for rotation about the axis of rotation of the operating lever between a neutral position and an operative position corresponding to the neutral position and operative position of the operating lever, said second member being adapted to be movable with the operating lever, said second member being flexible about an axis perpendicular to the axis of rotation of the means mounting the second member, one of said members having a projection and the other of said members having a recess in which said projection is received when the second member is in operative position, whereby releasably to detain said member in such position, a rotatable element adapted to operatively engage a rotatable steering element, an unlatching dog rotatable with said first rotatable element, a portion of said dog traveling through a path which sweeps over the first member, the second member being asymmetric about a central line extending radially from the axis of rotation of the mounting means for said member, at least one side edge of the second member being sloped so that said dog engages the surface of the second member facing the first member when the first rotatable element turns in one direction whereby to disengage the projection and recess, and the dog engages the opposite face of the second member when the first rotatable element is rotated in the opposite direction.

2. A self-cancelling mechanism as set forth in claim 1 wherein the second-named member is a leaf spring.

3. A self-cancelling mechanism as set forth in claim 1 wherein the switch operating element has two operative positions, one on each side of neutral position, and wherein there are two angularly spaced second-named members mounted to rotate about the axis of rotation of the lever and both adapted to be movable with the lever.

4. A self-cancelling mechanism as set forth in claim 1 wherein the switch operating element has two operative positions, one on each side of neutral position, wherein there are two angularly spaced second-named members mounted to rotate about the axis of rotation of the lever and both adapted to be movable with the lever, wherein both of the second-named members are arranged to cooperate with the first-named member and wherein both the second-named members are leaf springs.

5. A self-cancelling mechanism as set forth in claim 1 wherein the unlatching dog is mounted for pivotal movement about an axis perpendicular to the axis of rotation of the first rotatable element and is biased toward said first rotatable element.

6. A self-cancelling mechanism adapted to be used in connection with a signal control device that includes a switch having an operating element which is movable between a neutral position and an operative position and which element is biased to neutral position from operative position, said device further including a pivoted operating lever for actuating the operating element: said self-cancelling mechanism comprising a rotatable element adapted to operatively engage a rotatable steering element, a resilient element, means to mount said resilient element for rotation about the axis of rotation of the operating lever between a neutral position and an operative position corresponding to the neutral position and operative position of the operating lever, said resilient element being adapted to be movable with the operating lever, said resilient element being flexible about an axis perpendicular to the axis of rotation of the means mounting said resilient element, means providing a stationary recess, said resilient element including a projection, said recess being disposed to engage said projection when the resilient element is in operative position, and an unlatching dog mounted for rotation with first rotatable element for movement in a path of travel sweeping over said recess, an edge of said resilient element being upwardly and outwardly inclined so that when the first rotatable element turns the unlatching dog in one direction, if the resilient element is located over the recess, it will be unaffected by movement of the unlatching dog and if said element is located over the recess when the first rotatable element turns in the opposite direction, the unlatching dog will lift the resilient element thereby permitting said element to be restored to neutral position by the biasing means of the switch operating element.

7. A self-cancelling mechanism adapted to be used in connection with a signal control device that includes a switch having an operating element which is movable between a neutral position and two operative positions, one on each side of neutral position, and which element is biased to neutral position from both operative positions, said device further including a pivoted operating lever for actuating the operating element: said self-cancelling mechanism comprising a rotatable element adapted to operatively engage a rotatable steering element, a pair of resilient elements, means to mount said resilient elements for joint rotation about the axis of rotation of the operating lever between a neutral position and two operative positions corresponding to the neutral position and two operative positions of the operating lever, said resilient elements being adapted to be movable with the operating lever, each said resilient element being flexible about an axis perpendicular to the axis of rotation of the means mounting said resilient elements, means providing a stationary recess, each of said resilient elements including a projection, said recess being disposed to engage the projection of one of said resilient elements when that element is in its operative position and to engage the projection of the other resilient element when the latter resilient element is in its operative position, and an unlatching dog mounted for rotation with said first rotatable element for movement in a path of travel sweeping over said recess, the inner edge of each resilient element being outwardly and upwardly inclined so that when the first rotatable element turns the unlatching dog in one direction, if either resilient element is located over the recess it will be unaffected by movement of the unlatching dog, and if said resilient element is located over the recess and the first rotatable element turns in the opposite direction, the unlatching dog will lift such resilient element thereby permitting the same to be restored to neutral position by the biasing means of the switch operating element.

SOL H. LAPIDUS.

REFERENCES CITED

The following references are of record in the file of this patent:

UNITED STATES PATENTS

| Number | Name | Date |
|---|---|---|
| 1,928,315 | Martin | Sept. 26, 1933 |
| 2,034,414 | Pagerdarm | Mar. 17, 1936 |
| 2,207,114 | Bruderick | July 9, 1940 |
| 2,296,585 | Tobias | Sept. 22, 1942 |
| 2,308,108 | Roedding | Jan. 12, 1943 |